United States Patent
Ikuta et al.

(10) Patent No.: US 7,845,590 B2
(45) Date of Patent: Dec. 7, 2010

(54) SOUND GENERATING DEVICE FOR DUAL-BEARING REEL

(75) Inventors: Takeshi Ikuta, Sakai (JP); Kunio Takechi, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 12/494,290

(22) Filed: Jun. 30, 2009

(65) Prior Publication Data

US 2010/0006689 A1    Jan. 14, 2010

(30) Foreign Application Priority Data

Jul. 8, 2008    (JP)    .............................. 2008-178486

(51) Int. Cl.
*A01K 89/00* (2006.01)
(52) U.S. Cl. ...................... 242/296; 242/306
(58) Field of Classification Search ................. 242/296, 242/305, 306
See application file for complete search history.

(56) References Cited

U.S. PATENT DOCUMENTS

| | | | | |
|---|---|---|---|---|
| 3,771,746 A | * | 11/1973 | Griste | 242/255 |
| 4,153,220 A | * | 5/1979 | Nakajima | 242/296 |
| 4,546,937 A | * | 10/1985 | Hideo | 242/271 |
| 4,871,129 A | * | 10/1989 | Hashimoto | 242/255 |
| 4,988,057 A | * | 1/1991 | Hitomi | 242/245 |
| 6,168,105 B1 | * | 1/2001 | Nydegger | 242/255 |
| 6,578,785 B1 | * | 6/2003 | Hong | 242/245 |
| 6,805,313 B2 | * | 10/2004 | Nilsen | 242/303 |
| 7,234,661 B2 | * | 6/2007 | Hirayama et al. | 242/303 |
| 7,429,011 B1 | * | 9/2008 | Chang | 242/260 |
| 2004/0075005 A1 | * | 4/2004 | Myojo et al. | 242/310 |
| 2006/0016924 A1 | * | 1/2006 | Hirayama et al. | 242/245 |
| 2006/0060687 A1 | * | 3/2006 | Lee | 242/289 |

FOREIGN PATENT DOCUMENTS

FR    990962 A    9/1951

OTHER PUBLICATIONS

Shimano TLD 2-Speed Parts List, published Apr. 9, 2008 (particularly part Nos. 155, 194, 195, 237).

* cited by examiner

*Primary Examiner*—Evan H Langdon
(74) *Attorney, Agent, or Firm*—Shinjyu Global IP

(57) ABSTRACT

A lever sound generating device is constructed to generate a sound in response to rotation of a drag adjusting lever mounted to an outer peripheral surface of a boss formed on a reel unit of a dual-bearing reel. The sound generating device comprises a sound generating member and a striker mechanism. The sound generating member includes a truncated cone-shaped member with an undulated surface. The sound generating member is mounted to the boss and restricted from rotating and moving in an axially inward direction. The striker mechanism is mounted to the drag adjusting lever and arranged to repeatedly contact the undulated surface when the drag adjusting lever is rotated about the spool shaft.

8 Claims, 10 Drawing Sheets

SOUND GENERATING DEVICE FOR DUAL-BEARING REEL

CROSS-REFERENCE TO RELATED APPLICATIONS

This application claims priority under 35 U.S.C. §119 to Japanese Patent Application No. 2008-178486 filed on Jul. 8, 2008. The entire disclosure of Japanese Patent Application No. 2008-178486 is hereby incorporated herein by reference.

BACKGROUND OF THE INVENTION

1. Field of the Invention

The present invention relates to a sound generating device. More particularly, the present invention relates to a sound generating device for a dual-bearing reel contrived to generate a sound in response to rotation of a drag adjusting lever that is mounted to an external circumferential surface of a boss formed on a reel unit of the dual bearing reel so support a spool shaft such that the drag adjusting lever can rotate about the spool shaft.

2. Background Information

A lever drag type dual-bearing reel has a boss for supporting a spool shaft formed on a reel unit thereof. A drag adjusting lever is rotatably mounted on an external circumferential surface of the boss. A sound generating device is installed in the drag adjusting lever and contrived to generate a sound when the drag adjusting lever is rotated.

A conventional sound generating device (e.g., Shimano TLD 2-Speed Parts List, published 9 Apr. 2008 (particularly part numbers 155, 194, 195, 237)) has an undulated portion formed on an external circumferential surface of the boss and a leaf spring-like striker member fixed to the drag adjusting lever. The striker member is screw fastened to an inside surface of the drag adjusting lever, and a sound is generated by the undulated portion of the boss when a distal end of the striker member repeatedly strikes against the undulated portion.

SUMMARY OF THE INVENTION

It has been discovered in conventional practice, as described above, that the undulated portion is formed on the boss and the boss does not readily vibrate. Consequently, the sound is muffled and unclear and a clear, well-defined clicking sound is not obtained. A feasible way to address this problem is to mount a sound generating member having an undulated portion and contrived to vibrate readily onto the boss, thereby obtaining a clear, well-defined clicking sound. However, if a sound generating member is mounted to the boss, then a separate structure is needed to retain the sound generating member.

Accordingly, aspects of the present invention have been created to solve the above-mentioned problems occurring in the conventional practice, and to provide a sound generating device for a dual-bearing reel in which a sound generating member can be mounted to a boss without employing a retaining structure.

According to one aspect of the present invention, a sound generating device for a dual-bearing reel is constructed to generate a sound in response to rotation of a drag adjusting lever mounted to an outer peripheral surface of a boss formed on a reel unit of the dual-bearing reel. The sound generating device comprises a sound generating member and striker mechanism. The sound generating member is mounted to the boss and includes a substantially truncated cone-shaped member axially coinciding with the spool shaft, and an undulated surface formed along the outer peripheral surface of the cone-shaped member. The sound generating member is free to move in the axially outward direction and is restricted from rotating and moving in the axially inward direction. The striker mechanism is mounted to the drag adjusting lever and arranged to repeatedly contact the undulated surface upon rotation of the drag adjusting lever.

According to another aspect of the present invention, the drag adjusting lever has an installation portion defining an installation hole that is formed substantially perpendicular to the cone-shaped member.

According to still another aspect of the present invention, the striker mechanism includes a sounding pin and a force applying member installed in the installation hole. The force applying member is operatively connected to the sounding pin so as to urge the sounding pin toward the undulated surface.

According to yet another aspect of the present invention, the boss is cylindrical and protrudes from an outside wall surface of the reel unit. Movement of the sound generating member in the axially inward direction is restricted by the outside wall surface.

According to a further aspect of the present invention, the undulated surface includes circular arc-shaped recesses.

According to still a further aspect of the present invention, the sounding pin is made of a synthetic resin.

These and other features, aspects and advantages of the present invention will become apparent to those skilled in the art from the following detailed description, which, taken in conjunction with the annexed drawings, disclose example embodiments of the present invention.

BRIEF DESCRIPTIONS OF THE DRAWINGS

DETAILED DESCRIPTION OF AN EXAMPLE EMBODIMENT

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
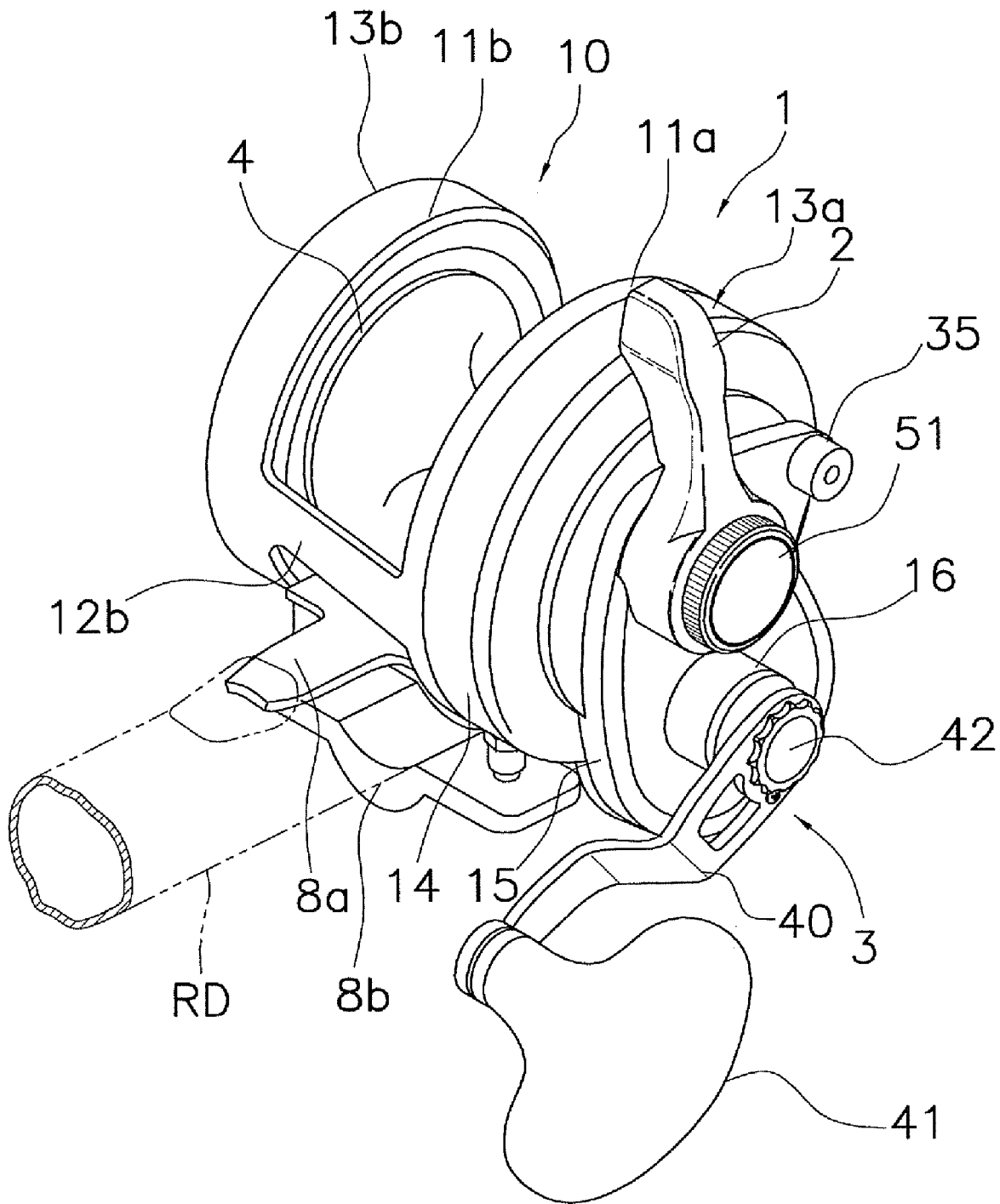
FIG. 1 is a perspective view of dual-bearing reel in which an embodiment of the present invention is employed.
Figure 2:
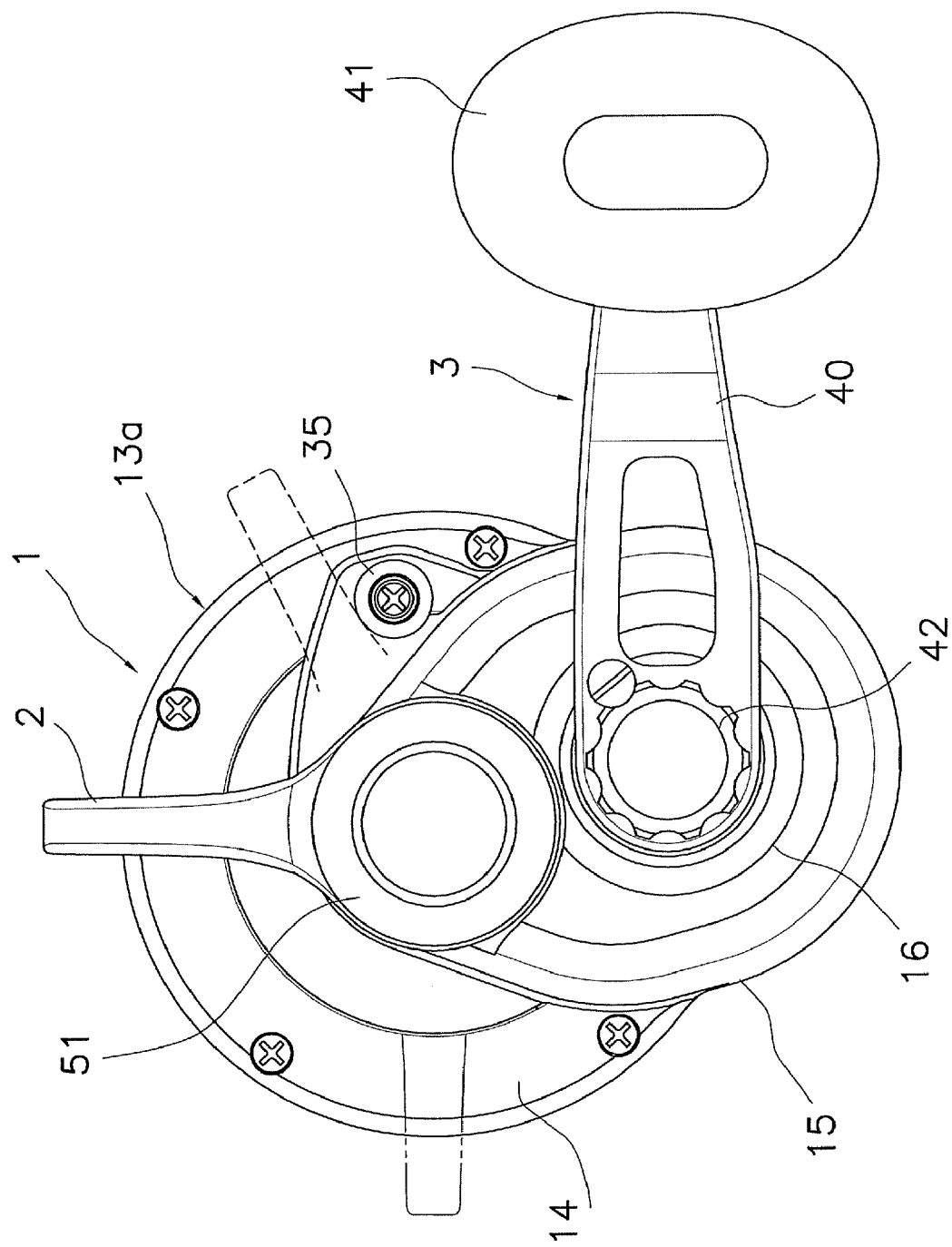
FIG. 2 is a side view of the handle side of the same dual-bearing reel.
Figure 3:
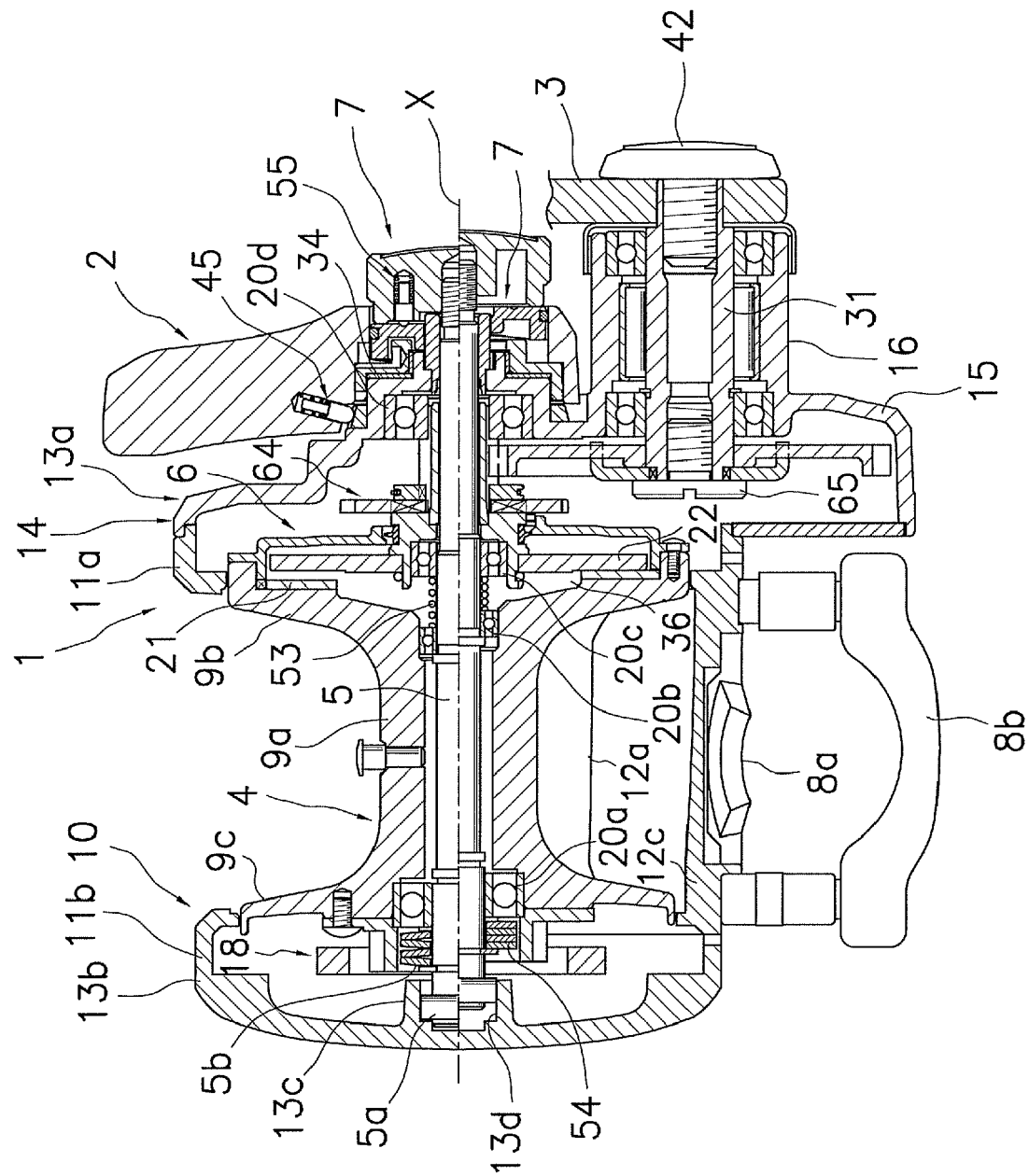
FIG. 3 is a cross sectional view of the same dual-bearing reel.

As shown in FIGS. 1 to 3, a dual-bearing reel according to an embodiment of the present invention is a small lever drag reel configured to wind a fishing line about an axis oriented crosswise with respect to a longitudinal direction of a fishing rod. The dual-bearing reel comprises a reel unit 1, a drag adjusting mechanism 7 including a drag adjusting lever 2 rotatably arranged on a side portion of the reel unit 1, a handle 3 rotatably supported on the reel unit 1 in a position below the drag adjusting lever 2, and a spool 4 arranged inside the reel unit 1. The dual bearing reel further comprises a spool shaft 5 arranged and configured to rotatably support the spool 4 and a drag mechanism 6 contrived to brake rotation of the spool 4 in a line reel-out direction.

Constituent Features of the Reel Unit

The reel unit 1 is a metal member made of, for example, an aluminum alloy. The reel unit 1 has a frame 10 and a first side plate 13a and a second side plate 13b arranged and configured to cover both sides of the frame 10. In this embodiment, the second side plate 13b is formed as a one-piece integral unit with the frame 10, but it is acceptable for the second side plate 13b to be a separate entity fastened to the frame 10. The frame 10 has a first cylindrical portion 11a on a handle 3 side thereof, a second cylindrical portion 11b that is smaller in diameter than the first cylindrical portion 11a and arranged to be spaced apart from the first cylindrical portion 11a along an axial direction of the spool shaft, and a plurality of connecting portions 12a to 12c arranged and configured to connect the cylindrical portions 11a and 11b together at frontward, rearward, and lower portions thereof. The external diameter of the first cylindrical portion 11a is, for example, from 110% to 140% of the external diameter of the second cylindrical portion 11b. In this embodiment, the external diameter of the first cylindrical portion 11a is from 110% to 120% of the external diameter of the second cylindrical portion 11b. The connecting portions 12a to 12c are formed as an integral unit with the first an second cylindrical portions 11a and 11b and, as shown in FIGS. 1 and 3, a metal rod mounting leg 8a is fixed to the lower connecting portion 12c. The rod mounting leg 8a extends in a longitudinal direction of a fishing rod RD and is employed in order to mount the reel to the rod RD. A rod clamp 8b is arranged opposite the rod mounting leg 8a such that the fishing rod RD is sandwiched in-between.

As shown in FIGS. 1 to 3, the first side plate 13a includes a cylindrical portion 14 that attaches to a side of the first cylindrical portion 11a and a bulged portion 15 configured to protrude outward along an axial direction of the cylindrical portion 14 (to the right in FIG. 2). As shown in FIGS. 1 and 3, the second side plate 13b is substantially circular in a side view and is integrally formed on a side of the second cylindrical portion 11b. The cylindrical portion 14 and the second side plate 13b are both substantially circular in a side view and each has approximately the same diameter as the first cylindrical portion 11a and the second cylindrical portion 11b, respectively. The external diameter of the first side plate 13a is larger than the external diameter of the second side plate 13b. The external diameter of the cylindrical portion 14 is, for example, from 110% to 140% of the external diameter of the second cylindrical portion 11b. In this embodiment, the external diameter of the first cylindrical portion 14 is from 110% to 120% of the external diameter of the second cylindrical portion 11b.

The bulged portion 15 is formed as an integral unit with the cylindrical portion 14 and is formed to protrude outward in an axial direction (rightward in FIG. 2) so as to contain a space that communicates with the cylindrical portion 14. The bulged portion 15 is a generally water droplet-shaped member having a smaller arc section above and a larger arc section below. The larger arc section protrudes downward beyond the cylindrical portion 14. The drag adjusting lever 2 and the handle 3 are mounted to the bulged portion 15 so as to be exposed to the outside.

Figure 4:
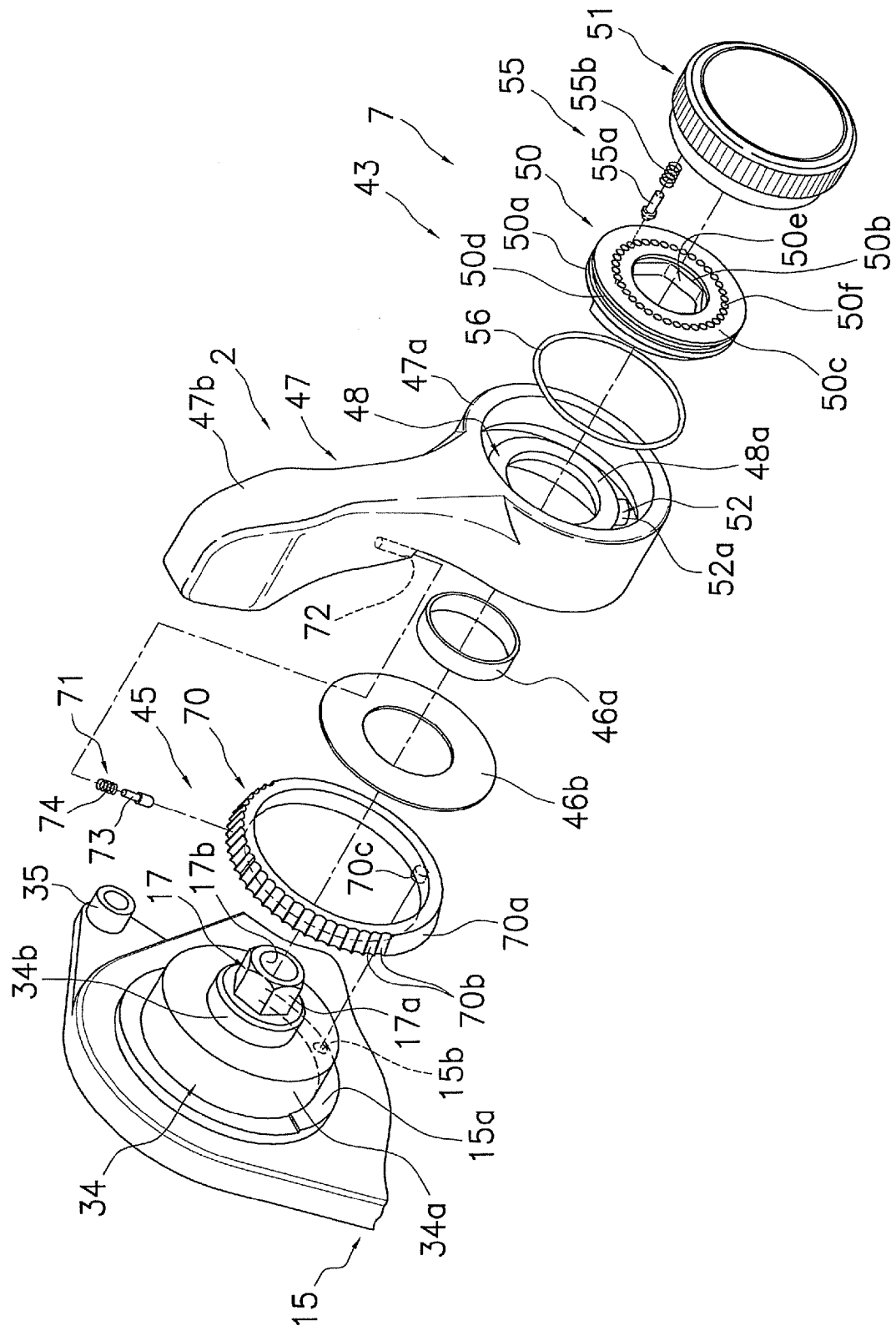
FIG. 4 is an exploded perspective view of a drag adjusting mechanism.
Figure 5:
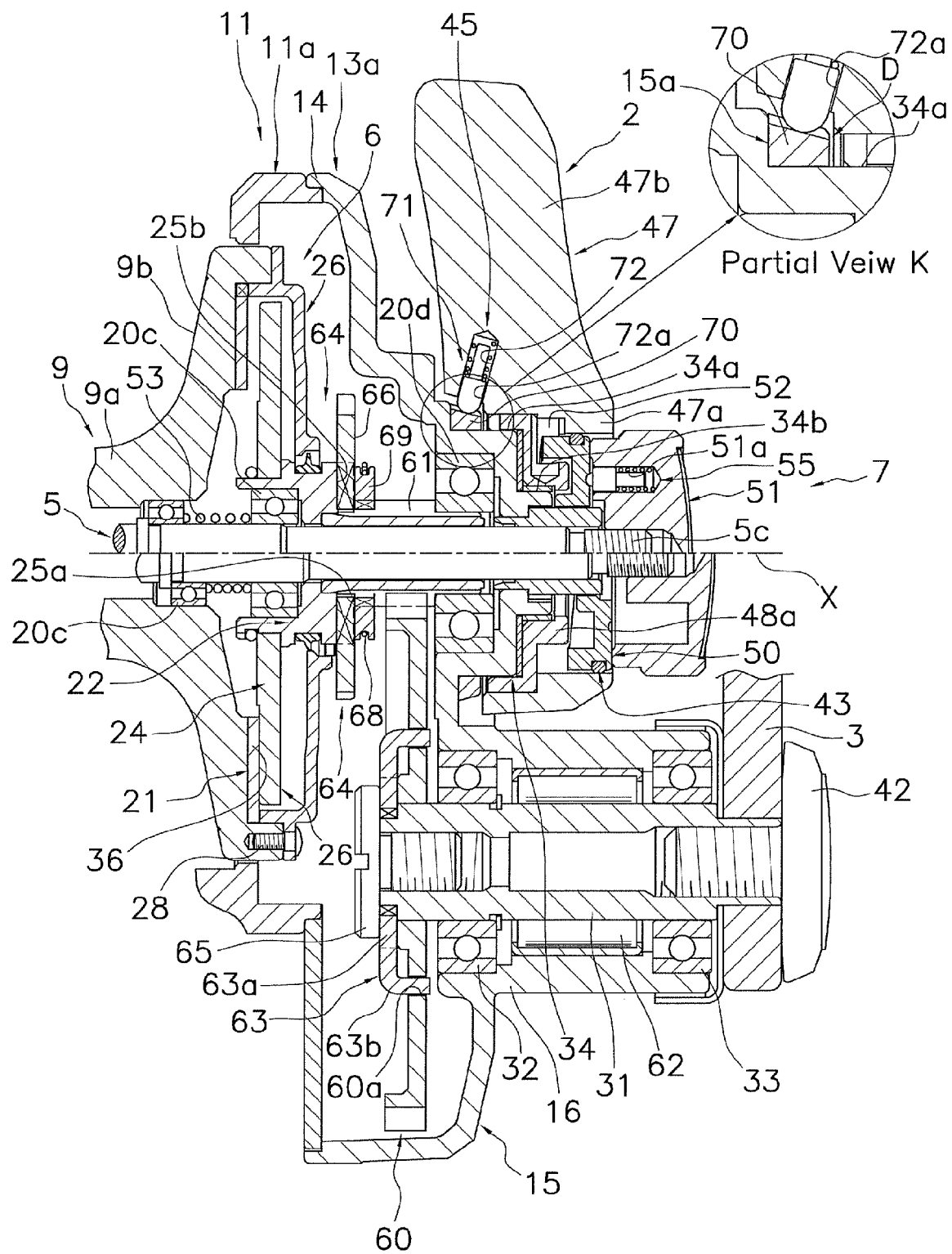
FIG. 5 is an enlarged cross sectional view showing constituent features of parts on the handle side.

As shown in FIGS. 4 and 5, the portion of the bulged portion 15 where the drag adjusting lever 2 is mounted is formed into a boss 34 for rotatably supporting the drag adjusting lever 2 and supporting the spool shaft 5. The boss 34 protrudes outward in a step-like fashion beyond other portions. The boss 34 has a large diameter protruding portion 34a and a small diameter protruding portion 34b that protrudes from the large diameter protruding portion 34a. A bearing 20d (explained later, see FIG. 5) is housed inside the large diameter protruding portion 34a. A guide member 17 for supporting a cam member 50 (explained later, see FIG. 5) such that the cam member 50 cannot rotate but can move in an axial direction is fixed inside the boss 34, i.e., more specifically, inside the small diameter protruding portion 34b.

The guide member 17 is crimp-fastened to the inside of the small diameter protruding portion 34b such that it passes through the first side plate 13a. The spool shaft 5 of the first side plate 13a passes through the smaller diameter protruding portion 34b. An outer peripheral surface of the guide member 17 is formed into a hexagonal guide section 17a, and an internal surface is formed into a through hole 17b configured such that the spool shaft 5 can pass there-through. A stopper 35 serving to establish a maximum drag position of the drag adjusting lever 2 is fixed to the bulged portion 15 in a position forward of the boss 34. The stopper 35 is arranged to touch against a lever portion 47b (explained later) of the drag adjusting lever 2 so as to restrict rotation of the drag adjusting lever 2 in a clockwise direction (clockwise from the perspective shown in FIG. 2).

Constituent Features of the Rotation Transmission System

A outwardly protruding cylinder 16 for mounting the handle 3 is formed on the bulged portion 15 in a position below the drag adjusting lever 2. As shown in FIGS. 3 and 5, a cylindrical handle shaft 31 is arranged inside the protruding cylinder 16 so as to be parallel to the spool shaft 5 (which is a shaft about which the spool 4 rotates). The handle shaft 31 is rotatably supported in the protruding cylinder 16 with two bearings 32 and 33 arranged at both ends of the protruding cylinder 16 and is arranged such that one end thereof (left end in FIG. 5) protrudes axially inward beyond the bearing 32. A main gear 60 is rotatably attached to the end portion of the handle shaft 31 that protrudes beyond the bearing 32.

As shown in FIGS. 1 to 3, the handle 3 is fixed to the other end portion (distal end) of the handle shaft 31. The handle 3 has a handle arm 40 that is fixed to the distal end of the handle shaft 31 and a handle knob 41 that is rotatably supported on a distal end of the handle arm 40. The handle arm 40 is fastened to the distal end of the handle shaft 31 with a screw member 42 such that it can rotate as an integral unit with the handle shaft 31. In order to make it easier to grip and apply force to, the external shape of the handle knob 41 is formed to be rounded and generally T-shaped.

As shown in FIG. 5, the main gear 60 is prevented from rotating by a rotation preventing member 63 such that it rotates integrally with the handle shaft 31. The rotation preventing member 63 is connected to the handle shaft 31 such that it can rotate integrally there-with and is fastened the handle shaft 31 with a fastening bolt 65 screwed into to the proximal end of the handle shaft 31. The rotation preventing member 63 has a ring portion 63a connected to the handle shaft 31 such that it can rotate integrally there-with and a pair of interlocking portions 63b configured to interlock with the main gear 60. The interlocking portions 63b are bent in an L-shaped fashion from the outer circumference of the ring portion 63a and arranged on diametrically opposite sides of the ring portion 63a. The main gear 60 is provided with a pair interlocking holes 60a configured and arranged to interlock with the interlocking portions 63b. The main gear 60 meshes with a pinion gear 61.

Figure 6:
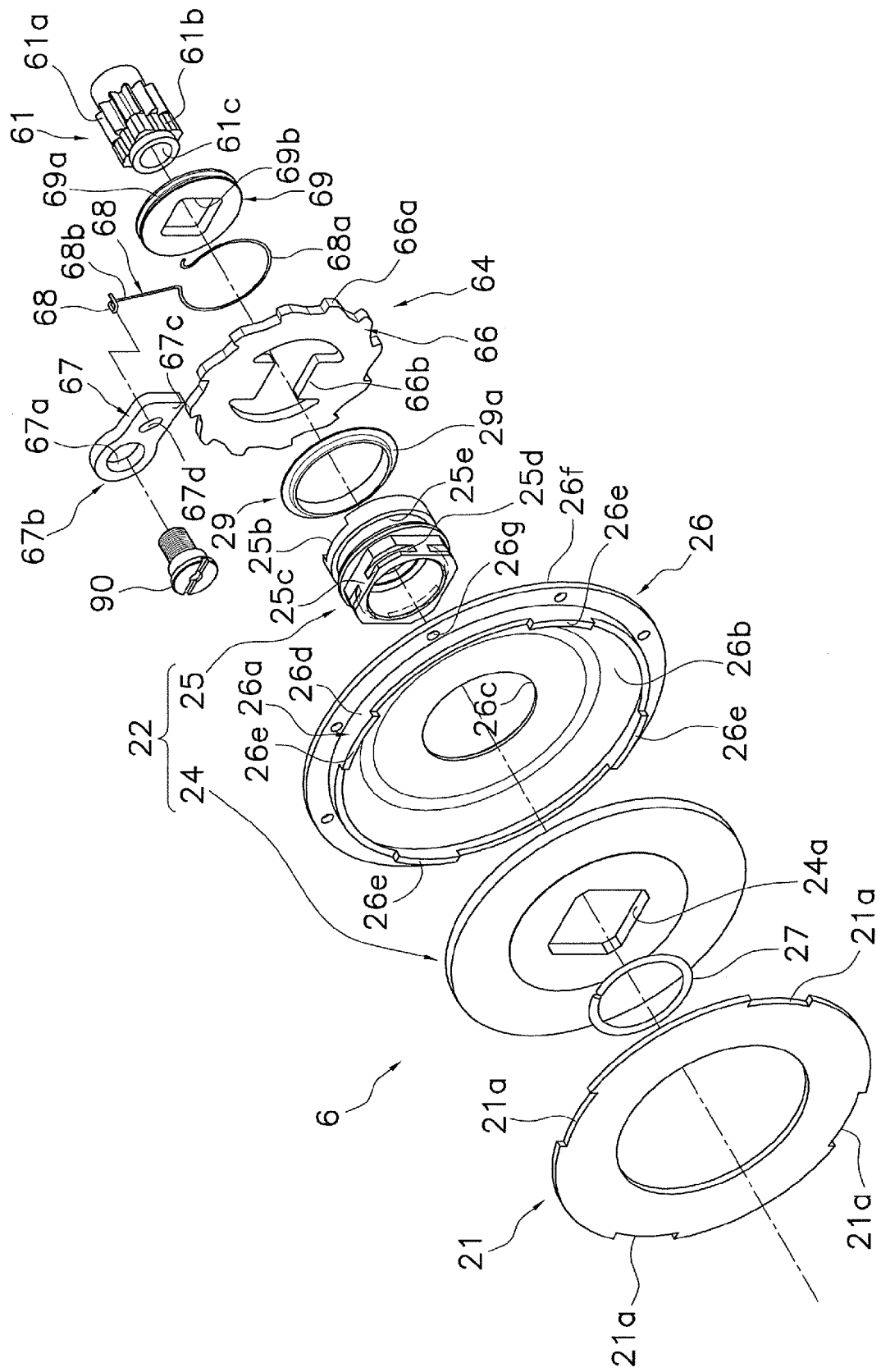
FIG. 6 is an exploded perspective view showing constituent features of a rotation transmission system that includes a drag mechanism.

The pinion gear 61 is mounted onto the outside of the spool shaft 5 such that it can rotate about the spool shaft 5. The pinion gear 61 is rotatably supported with respect to the reel unit 1 by a bearing 20d that is installed inside the large diameter protruding portion 34a of the boss 34 of the first side plate 13a. As shown in FIG. 6, gear teeth 61a configured to mesh with the main gear 60 and a disk support portion 61b formed to be generally rectangular are provided on an external circumferential surface of the pinion gear 61. Machining scars left by a gear cutting tool when the gear teeth 61a were made remain on the disk support portion 61b. An internal circumferential surface of the pinion gear 61 forms a through hole 61c configured for the spool shaft 5 to pass through. An internal circumferential portion of a brake disk 22 (described later) of the drag mechanism 6 is connected to the disk support portion 61b of the pinion gear 61 such that it can rotate integrally therewith. As a result, rotation of the handle 3 is transmitted to the friction disk 21 through the main gear 60, the pinion gear 61, and the brake disk 22. The friction disk 21 transfers the rotation to the spool 4 and the spool 4 rotates. A spring support plate 69 of a second one-way clutch 64 (explained later) is also mounted to the disk support portion 61b such that it can rotate integrally therewith.

Constituent Features of the Spool Shaft and Surrounding Parts

As shown in FIG. 3, the spool shaft 5 is a shaft member supported on the reel unit 1 such that it can move in an axial direction but cannot rotate relative to the reel unit 1. An end of the spool shaft 5 depicted as the left end in FIG. 3 is supported in a boss 13c formed in a center portion of the second side plate 13b. The boss 13c protrudes in an inward direction and the left end of the spool shaft 5 is supported therein such that it can move in an axial direction but cannot rotate relative to the boss 13c. A rotation preventing pin 5a for preventing the spool shaft 5 from rotating is arranged to pass through the spool 5 at a position closer to the left end of the spool shaft 5. The rotation preventing pin 5a engages with a rotation preventing groove 13d formed in the boss 13c.

Bearings 20a and 20b for rotatably mounting the spool 4 and a bearing 20c for rotatably supporting the brake disk 22 are attached to the outside circumference of the spool shaft 5.

Constituent Features of the One-Way Clutches

As shown in FIG. 5, a roller type first one-way clutch 62 is arranged between the bearings 32 and 33. The first one-way clutch 62 only allows forward rotation of the handle shaft 31 in the line winding direction and prohibits reverse rotation in the line reel-out direction. A pawl type second one-way clutch 64 is arranged on the outer circumference of the spool shaft 5. The second one-way clutch 64 prevents reverse rotation of the handle shaft 31 by acting on the pinion gear 61.

The first and second one-way clutches 62 and 64 are used chiefly for operating the drag mechanism 6. As shown in FIG. 6, the second one-way clutch 64 has a ratchet wheel 66 connected to the brake disk such that it can rotate integrally therewith, a ratchet pawl 67 configured to engage with the ratchet wheel 66, an spring member 68 arranged to apply a spring force to the ratchet pawl 67, and a spring support plate 69 for mounting the spring member 68.

The ratchet wheel 66 is a plate-like member, an external circumferential surface of which is formed to have generally saw-like ratchet teeth 66a configured to mesh with the ratchet pawl 67, and a radially inward portion of which is provided with an engaging protrusion 66b configured to engage with the brake disk 22. The engaging protrusion 66b is connected to an end face of a core member 25 (explained later) of the brake disk 22 such that it can rotate integrally therewith.

The ratchet pawl 67 is rotatably supported on a pivot shaft 90 that is screwed into an inside surface of the first side plate 13a. At a proximal end thereof the ratchet pawl 67 has a pivot support portion 67b provided with a support hole 67a configured to be supported on the pivot shaft 90, and at a distal end thereof the ratchet pawl 67 has a pawl portion 67c configured to mesh with the ratchet teeth 66a of the ratchet wheel 66. An engaging slot 67d configured to engage with the spring member 68 is formed in a middle portion of the ratchet pawl 67. Due to the spring action of the spring member 68, the ratchet pawl 67 pivots between a contact position in which it contacts the ratchet wheel 66 and prohibits rotation of the ratchet wheel 66 and a separated position in which it is separated from the ratchet wheel 66 so as to reduce the sound of the ratchet wheel 66 rotating in the line winding direction. The separated position of the ratchet pawl 67 is restricted to a position only slightly separated from the ratchet wheel 66 by a restricting part (not shown) provided on an inside surface of the first side plate 13a.

The spring member 68 serves both to separate the ratchet pawl 67 from the ratchet wheel 66 when the spool 4 rotates in the line winding direction so as to quiet the sound of the second one-way clutch 64 and to force the ratchet pawl 67 toward the ratchet wheel 66 when the spool 4 rotates in the line reel-out direction. The spring member 68 is made of a metal wire material having a spring quality and is arranged such that it spring loads the ratchet pawl 67 in a different direction depending on the direction in which the spool 4 rotates. The spring member 68 is has a C-shaped mounting portion 68a configured to engage frictionally with a mounting groove 69a of the spring support plate 69, an arm portion 68b that extends in a radial direction from the mounting portion 68a, and a curved portion 68c that is bent from the arm portion 68b and configured to curve in a U-shaped manner and engage with the engaging slot 67d. When the spool 4 rotates in the line winding direction and the brake disk 22 rotates in the same direction, the spring member 68 applies a spring force against the ratchet pawl 67 in a direction of separating from the ratchet wheel 66. Conversely, when the spool 4 rotates in the line reel-out direction and the brake disk 22 rotates in the same direction, the spring member 68 applies a spring force against the ratchet pawl 67 in a direction of moving closer to the ratchet wheel 66. As a result, rotation of the brake disk 22 in the line reel-out direction is prevented.

The spring support plate 69 is a circular disk shaped member having a mounting groove 69a configured to frictionally engage with the mounting portion 68a of the spring member 68 formed in an external circumferential surface thereof. In a radially inward portion of the spring support plate 69 there is formed a rectangular connecting hole 69b configured to connect to the disk support portion 61b of the pinion gear 61 such that the spring support plate 69 can rotate integrally with the pinion gear 61.

Constituent Features of the Spool

Figure 7:
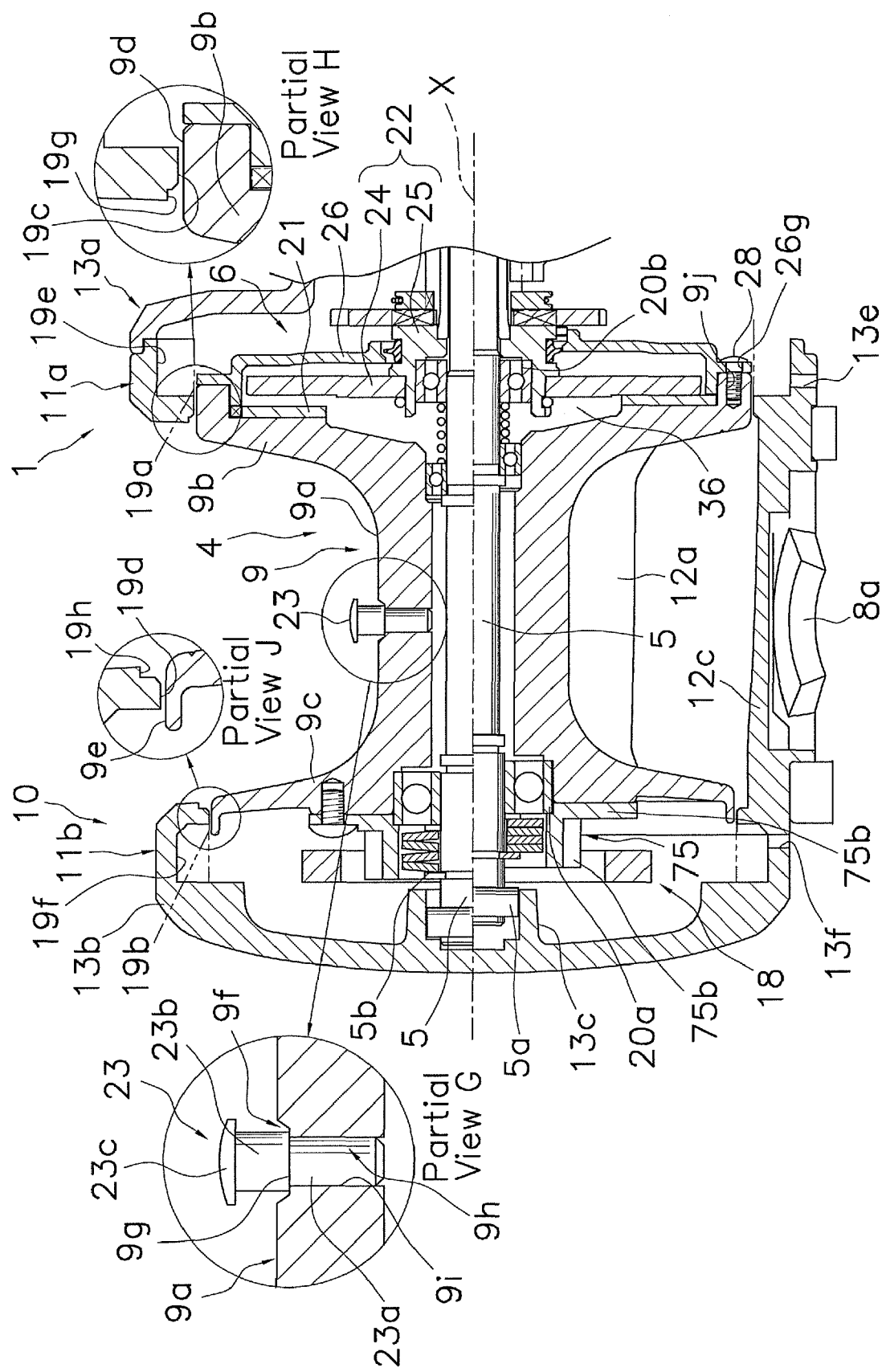
FIG. 7 is a cross sectional view focusing on specific portions surrounding a spool.

As shown in FIG. 7, the spool 4 comprises a spool unit 9 and a fishing line stop pin 23 that is fixed to the spool body 9. The spool unit 9 has a cylindrical line winding body portion 9a that is configured for a fishing line to be wound onto an outside circumferential surface thereof and arranged such that a gap exists between an internal circumferential surface thereof and an external circumferential surface of the spool shaft 5. The spool unit 9 also has a first flange portion 9b and a second flange portion 9c that are larger in diameter than the line winding body portion 9a and arranged on both sides of the line winding body portion 9a. The spool unit 9 also has a counterbored portion 9f formed in the outside circumferential surface of the line winding body portion 9a and a pin fixing portion 9h formed in the counterbored portion 9f.

The spool unit 9 is rotatably supported on the spool shaft 5 with bearings 20a and 20b. The drag mechanism 6 is provided on the handle 3 side of the spool 4. A spool sound generating mechanism 18 contrived to generate a sound when the spool 4 rotates is provided on the second side plate 13b side of the spool 4.

As shown in the partial view G of FIG. 7, the counterbored portion 9f is a circular recess formed in the external circumferential surface of the line winding body portion 9a at a middle position with respect to an axial direction. A bottom surface 9g of the counterbored portion 9f is flat and the pin fixing portion 9h—which has a through hole 9i—is formed in a center of the bottom surface 9g. The through hole 9i is formed to pass from the bottom surface 9g to the internal circumferential surface of the line winding body portion 9a along a radial direction of the line winding body portion 9a.

The fishing line stop pin 23 serves to hold an end of the fishing line and is secured by being press fitted into the through hole 9i (which is positioned midway along the axial direction of the line winding body portion 9a). The fishing line stop pin 23 has a first shaft portion 23a configured to be press fitted into the through hole 9i, a second shaft portion 23b having a larger diameter than the first shaft portion 23a and configured such that a fishing line can be held on an external circumferential surface thereof by, for example, tying the fishing line, and a head portion 23c having a larger diameter than the second shaft portion 23b.

Thus, the fishing line stop pin 23 is made to have a first shaft portion 23a and a second shaft portion 23b that is larger in diameter than the first shaft portion 23a. The first shaft portion 23a is configured to be press fitted into the through hole, and the counterbored portion 9f is configured to have a flat bottom surface 9g. Consequently, the press fitting of the fishing line stop pin 23 into the through hole 9i can be ended when the step-like portion between the first shaft portion 23a and the second shaft portion 23b contacts the bottom surface 9g, and the amount by which the fishing line stop pin 23 is pressed in can be held to a prescribed amount. Moreover, since the step-like portion contacts the flat bottom surface 9g, it is more difficult for a gap to exist between the step-like portion and the bottom surface 9g and more difficult for the fishing line to become pinched between the step-like portion and the bottom surface 9g.

The first flange portion 9b is larger in diameter than the second flange portion 9c, and the axial length of an external circumferential surface 9d is longer than the axial length of an external circumferential surface 9e of the second flange portion 9c. A storage space 36 configured such that the drag mechanism 6 can be stored therein is formed in an outside face of the first flange portion 9b.

The first flange portion 9b is inserted into the first cylindrical portion 11a, and the second flange portion 9c is inserted into the second cylindrical portion 11b. The first cylindrical portion 11a has a circular first opening 19a configured such that the first flange portion 9b can be inserted therein. The first cylindrical portion 11a has a first facing portion 19c that is provided at the edge of the first opening 19a, faces toward the external circumferential surface of the first flange portion 9b at the edge of the opening such that it forms only a small gap (e.g., 0.2 to 0.7 mm) therewith, and is shorter in length than the external circumferential surface of the first flange portion 9b. The first cylindrical portion 11a also has a first escape portion 19e arranged farther outward along the axial direction of the spool shaft than the first facing portion 19c and having a larger diameter than the first facing portion 19c. Additionally, the first cylindrical portion 11a has a first escape portion 19e arranged on an inward side of the first facing portion 19c along an axial direction of the spool shaft and having a larger diameter than the first facing portion 19c. In this explanation, "inward along the axial direction of the spool shaft" means axially toward a middle portion of the spool unit 9 (i.e., the portion where the fishing line stop pin 23 is installed), and "outward along the axial direction of the spool shaft" means in an axial direction oriented away from the middle portion of the spool unit 9.

The second cylindrical portion 11b has a circular second opening 19b configured such that the smaller diameter second flange portion 9c of the spool unit 9 can be inserted therein. Thus, the second opening 19b has a smaller diameter than the first opening 19a. As shown in FIG. 7, the second cylindrical portion 11b has a second facing portion 19d that is provided at the edge of the second opening 19b, faces toward the external circumferential surface of the second flange portion 9c at the edge of the opening such that it forms only a small gap (e.g., 0.2 to 0.7 mm) therewith, and is shorter in length than the external circumferential surface of the second flange portion 9c. The second cylindrical portion 11b also has a second escape portion 19f arranged farther to the outside along the axial direction of the spool shaft than the second facing portion 19d and having a larger diameter than the second facing portion 19d. Additionally, the second cylindrical portion 11b has a fourth escape portion 19h arranged on an inward side of the second facing portion 19d along the axial direction of the spool shaft and having a larger diameter than the second facing portion 19d.

In this way, since the length of the portion where the first opening 19a and the first flange portion 9b (which is normally longer than the second flange portion 9c) face each other is short, a liquid entering the gap there-between will flow more readily toward the first escape portion 19e where the gap is wider. As a result, a liquid entering the gap between the first opening 19a and the first flange portion 9b will be less likely to inhibit the ability of the spool 4 to rotate freely.

Additionally, a first water drain hole 13e is provided in a portion of the first cylindrical portion 11a where the first escape portion 19e is formed and a second water drain hole 13f is provided in a portion of the second cylindrical portion 11b where the second escape portion 19f is formed. The water drain holes are formed in portions corresponding to the lower connecting portion 12c. The first and second water drain holes 13e and 13f serve to discharge any liquid that enters the reel through the gap between the first flange portion 9b and the first opening 19a or the gap between the second flange portion 9c and the second opening 19b.

Constituent Features of the Drag Adjusting Mechanism

As shown in FIGS. 3 to 5, the drag adjusting mechanism 7 serves as a moving mechanism for moving the drag mechanism 6 in order to change and adjust a drag force applied against rotation of the spool 4 (which is mounted to the spool shaft 5) in the line reel-out direction. In FIGS. 3 and 5, the portion below the center axis X of the spool shaft 5 indicates an axial position of the spool shaft 5 when the drag adjusting mechanism 7 is set for maximum drag, and the portion above indicates an axial position of the same when the drag adjusting mechanism 7 is in a released state.

The drag adjusting mechanism 7 comprises a cam mechanism 43 contrived to convert rotation of the drag adjusting lever 2 into a movement of the drag mechanism 6 along an axial direction of the spool shaft, a rotation restricting portion 44 (see FIG. 10) provided in the cam mechanism 43 and contrived to restrict rotation of the drag adjusting lever 2, and a lever sound generating mechanism 45 contrived to generate a sound when the drag adjusting lever 2 is rotated.

Constituent Features of the Drag Adjusting Lever

The drag adjusting lever 2 is arranged such that the drag force increases when the drag adjusting lever 2 is rotated clockwise (clockwise from the perspective of FIG. 2) and decreases when the drag adjusting lever 2 is rotated counterclockwise. A position slightly clockwise of the position depicted with a solid-line sketch is a strike position, the position depicted with a double-dot chain line is a drag release position, and the position depicted with a broken line sketch is a maximum drag position. The strike position is a position that can be adjusted to a drag force at which the hook will pierce the fish's mouth securely but the fishing line will not break when a fish suddenly bites and pulls strongly. Typically it is set to approximately one-third of the breakage strength of the fishing line.

The drag adjusting lever 2 is rotatably attached to the external circumferential surfaces of the large diameter protruding portion 34a and the small diameter protruding portion 34b of the boss 34 of the first side plate 13a. The drag adjusting lever 2 has a lever unit 47 made of, for example, an aluminum alloy and an insert member 48 configured to be press fitted into the lever unit 47 and made of, for example, a zinc alloy. The lever unit 47 has a proximal end portion 47a arranged to surround the boss 34 and a lever portion 47b that extends radially outward from the proximal end portion 47a. A cut-out portion 47c is diagonally formed in an internal circumferential surface of the proximal end portion 47a at a portion bordering with the lever portion 47b, and the lever sound generating mechanism 45 is installed therein. The insert member 48 is press fitted into an internal circumferential surface of the proximal end portion 47a such that it is fixed therein.

The insert member 48 is a stepped cylindrical member rotatably supported on the large diameter protruding portion 34a and the small diameter protruding portion 34b. Two cam receiving pins 52a constituting a cam receiving section 52 of the cam mechanism 4, for example, are erectly provided on an external circumferential surface of a small diameter cylindrical portion 48a of the insert member 48 so as to extend along a radial direction. As shown in FIG. 4, a radial bush 46a for rotatably supporting the insert member 48 is arranged between the small diameter cylindrical portion 48a of the insert member 48 and the small diameter protruding portion 34b of the boss 34. A thrust ring 46b is installed so as to be axially supported between the insert member 48 and a wall surface 34c of the boss 34.

Constituent Features of Lever Sound Generating Mechanism

The lever sound generating mechanism 45 serves to accomplish positioning of the drag adjusting lever 2 in addition to generating a sound when the drag adjusting lever 2 is operated. As shown in FIGS. 4 and 5, the lever sound generating mechanism 45 includes a cylindrical sound generating member 70 mounted on the external circumferential surface of the large diameter protruding portion 34a of the boss 34 and a striker mechanism 71 contrived to repeatedly strike against the sound generating member 70.

The sound generating member 70 is a ring shaped member made of, for example, polyacetal or another synthetic resin that is comparatively hard and has an excellent sliding property. The sound generating member 70 has a cone-shaped surface 70a that tapers to a smaller diameter as one moves in an outward direction along an axial direction of the spool shaft 5, and an undulated portion 70b formed along a circumferential direction of the cone-shaped surface 70a. The undulated portion 70b comprises circular arc-shaped recesses formed in the cone-shaped surface 70a. The sound generating member 70 is installed on the large diameter protruding portion 34a such that it cannot rotate, its movement in an axially inward direction is restricted, and its movement in an axially outward direction is unrestricted. Movement of the sound generating member 70 in the axially inward direction is restricted by an outside wall surface 15a of a portion of the bulged portion 15 where the boss 34 is formed. A rotation preventing hole 15b is formed in the outside wall surface 15a, and a rotation preventing protrusion 70c configured to engage with the rotation preventing hole 15b is formed on the sound generating member 70. As a result, movement of the sound generating member 70 in the axially inward direction is restructured and the sound generating member 70 is prevented from rotating. However, movement of the sound generating member 70 in the axially outward direction is not restricted. FIG. 5 shows an enlarged view of a spacing D between a section of the lever portion 47b and the sound generating member 70. The spacing D allows the sound generating member 70 to move outwardly in the axial direction.

The lever sound generating mechanism 45 also has an installation portion 72 provided with an installation hole 72a formed in the cut-out portion 47c of the drag adjusting lever 2 along an axis substantially perpendicular to the cone-shaped surface 70a. The striker mechanism 71 has a sounding pin 73 installed in the installation hole 72a such that it can move back and forth toward and away from the cone-shaped surface 70a and a coil-type spring member 74 installed in the installation hole 72a such that it spring loads the sounding pin 73 toward the undulated portion 70b. The sounding pin 73 is made of, for example synthetic resin material and configured such that distal end thereof is spherical and a proximal end thereof is smaller in diameter than the distal end. The spring member 74 is arranged on the outside circumference of a proximal end portion of the sounding pin 73.

Thus, in this embodiment, a sound generating member 70 is made to have a tapered cone-shaped surface 70a whose diameter decreases along an axially outward direction, an undulated portion 70b is formed on the cone-shaped surface 70a, and a sounding pin 73 of a striker mechanism 71 is arranged and configured to contact the undulated portion 70b in an elastic fashion. Since the striker mechanism 71 spring loads the sound generating member 70 in an axially inward direction, the sound generating member 70 is retained in place by the striker mechanism 71. As a result, the sound generating member 70 can be mounted to the boss 34 without providing a separate retaining structure.

Also, since the installation hole 72a is formed along an axis substantially perpendicular to the cone-shaped surface 70a, the sounding pin 73 spring loaded by the spring member can be 74 can serve to spring load the sound generating member 70 axially inward while allowing the sound generating member 70 to move freely in the axially outward direction. Thus, since sounding pin 73 spring loaded by the spring member 74 can spring load the sound generating member 70 axially inward, the striker member can serve to retain the sound generating member 70 in position. As a result, a clear clicking sound is generated and the sound generating member can be retained more securely with the sounding pin.

Since the installation hole 72a is formed diagonally, even if it is formed in a position close to an inward side surface of the drag adjusting lever 2, the distance between the installation hole 72a and the inward side surface will gradually increase.

As a result, the installation hole 72a is less likely to cause a portion where the wall thickness is thin to exist in the drag adjusting lever 2 and the decrease in strength at the portion where the installation hole 72a is made can be suppressed.

Once the sounding pin 73 is installed in the installation hole 72a, it is difficult to remove. However, since the sounding pin 73 is made of a synthetic resin that does not readily corrode, the lever sound generating mechanism 45 is maintenance free because the sounding pin 73 will not corrode and become jammed in the installation hole 72a.

Constituent Features of the Cam Mechanism

The cam mechanism 43 comprises a cam member 50, a drag adjusting knob 51, a cam receiving portion 52, and a first force applying member 53. The cam member has a cam surface 49. The drag adjusting knob 51 is for setting an adjustment range of the drag adjusting lever 2. The cam receiving portion 52 is arranged such that it can contact the cam surface 49 and serves to move the cam member 50 in a first axial direction (rightward in FIG. 5) when the drag adjusting lever 2 is rotated clockwise from the perspective FIG. 2. The first force applying member 53 is a coil spring serving to generate a spring force that acts through the drag adjusting knob 51 so as to move the cam member 50 in a second axial direction such that it contacts the cam receiving portion 52 when the drag adjusting lever 2 is rotated counter-clockwise from the perspective of FIG. 2. The drag adjusting mechanism 7 has a second force applying member 54 that serves to spring load the spool 4 in a direction of separating from the spool shaft 5 (rightward in FIG. 3) and comprises, for example, four Belleville springs.

Constituent Features of the Cam Member

Figure 8:
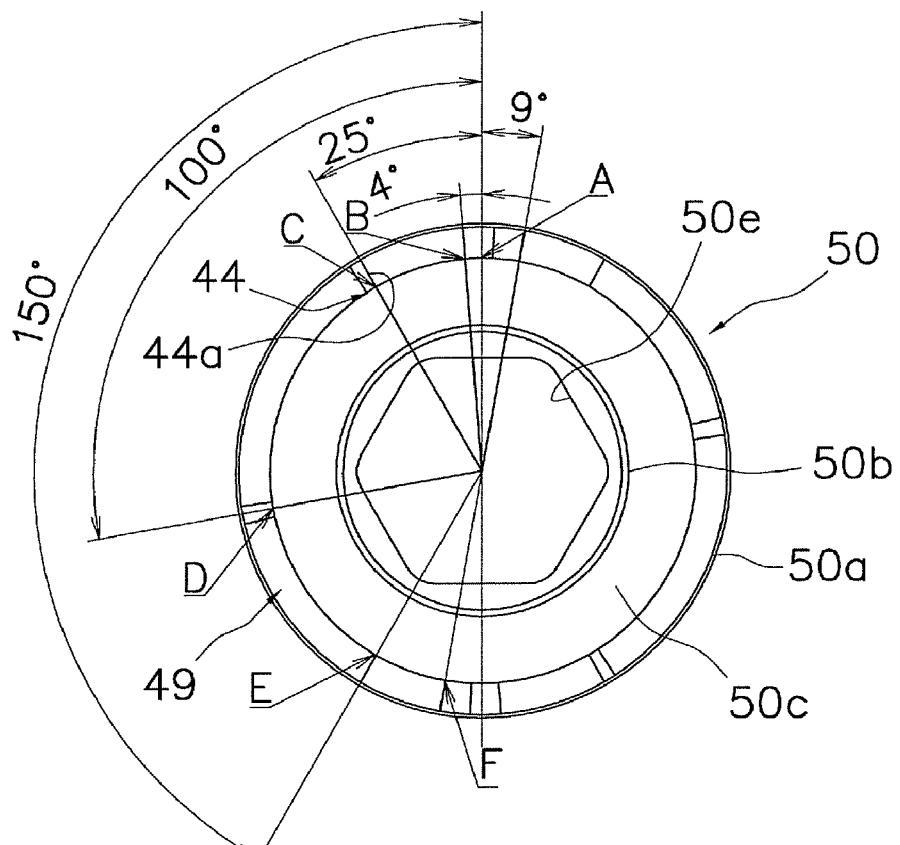
FIG. 8 is a frontal view of a cam member.
Figure 9:
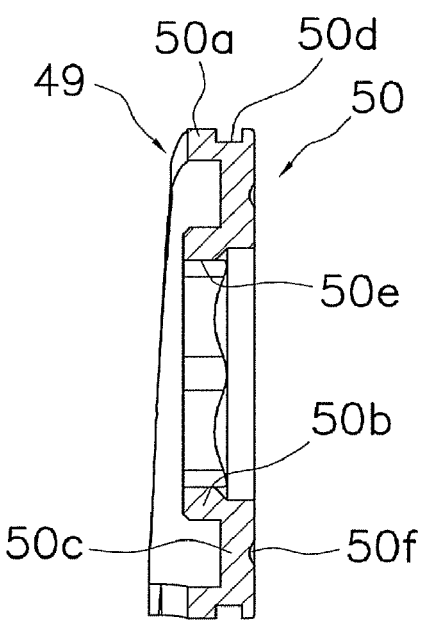
FIG. 9 is a cross sectional view of the cam member.

The cam member 50 is a cylindrical member made of, for example, a stainless metal alloy. As shown in FIGS. 8 and 9, the cam member 50 has an outer cylindrical portion 50a, an inner cylindrical portion 50b, and a disk portion 50c that joins the outer cylindrical portion 50a and the inner cylindrical portion 50b together. The cam surface 49 is formed on an edge of the outer cylindrical portion 50a. An annular groove 50d configured for an O-ring 56 to be installed therein is formed in the outer cylindrical portion 50a. An internal surface of the inner cylindrical portion 50b is made into hexagonal hole 50e configured to engage with the hexagonal guide section 17a of the guide member 17. Sounding recesses 50f forming part of a knob sound generating mechanism 55 (explained later) are formed in an outward surface of the disk portion 50c.

Figure 10:
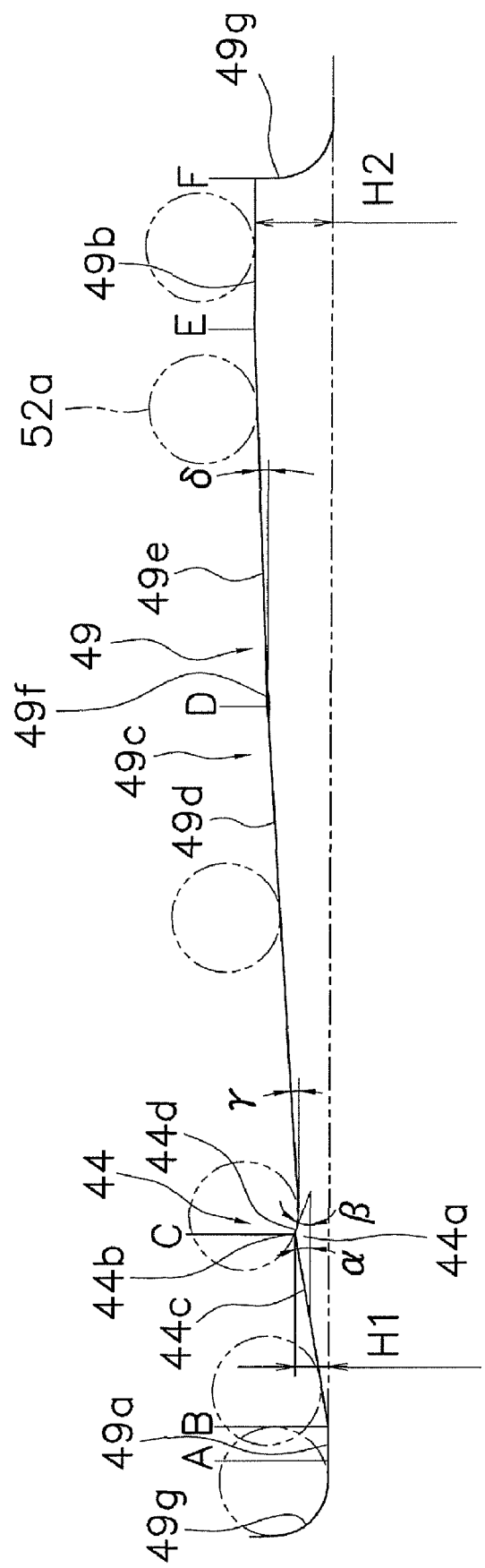
FIG. 10 is a development view depicting a circular arc-shaped cam surface in a linear fashion.

As shown in FIGS. 8 and 10, the cam surface 49 is a slanted surface formed along an edge face of the cam member 50 in an overall circular arc-like shape and configured such that its protruding height gradually decreases. Two cam surfaces 49 having the same shape are formed at 180° intervals. A rotation restricting portion 44 configured to restrict rotation of the drag adjusting lever 2 is formed on both sides of a restriction position C located at an intermediate portion of the cam surface 49. The restriction position C is located, for example, 25° to 30° away from a reference position A of the cam surface 49.

The rotation restricting portion 44 has a restricting protrusion 44a configured to protrude toward the cam receiving pin 52a. The restricting protrusion 44a has an apex 44b positioned at the restriction position C, a first slanted surface 44c that declines from the apex 44b to a first position B equivalent to a drag release position, and a second slanted surface 44d that declines from the apex 44b in a direction opposite the first position B. A slant angle α of the first slanted surface 44c is smaller than a slant angle β of the second slanted surface 44d. The slant angle α is preferably larger than 10° and smaller than or equal to 18°, e.g., 14° in this embodiment. The second slanted surface 44d is formed with a circular arc whose radius of curvature is substantially equal to a radius of curvature of a cam receiving pin 52a, indicated in FIG. 10 with a double-dot chain line. The slant angle β of a tangential line intersecting at the apex 44b is preferably larger than 18° and smaller than or equal to 25°, e.g., 20° in this embodiment. A first height H1 of the apex 44b in an axial direction of the spool shaft is smaller than one half of a second height H2 of the restricting protrusion 44a at a second position E corresponding to a maximum drag position. In this embodiment, for example, the first height H1 of the apex 44b is from 0.6 to 0.8 mm and the second height H2 of the second position E is from 1.7 to 2.0 mm. In this embodiment, the second position E is 150° from the reference position A.

The first slanted surface 44c and the second slanted surface 44d on both sides of the apex 44b of the restricting protrusion 44a are configured such that the slant angle α of the first slanted surface 44c (which is on the drag release position side) is smaller than the slant angle β of the second slanted surface 44d. Consequently, when the drag adjusting lever 2 is rotated from the maximum drag position side to the rotation restricting portion 44, before the restricting protrusion 44 is passed, the drag force increases and it becomes more difficult to rotate the drag adjusting lever 2 toward the drag release position. Conversely, when the drag adjusting lever 2 is rotated from the drag release position toward the rotation restricting portion 44, the change in the drag force is smaller and the rotation operation is easier to perform because the slope of the first slanted surface 44c is more gradual.

Additionally, since the first height H1 of the apex 44b in an axial direction of the spool shaft is smaller than one half of the second height H2 of the restricting protrusion 44a at the second position E (which corresponds to a maximum drag position), the apex 44b is located in a position corresponding to a movement amount of the spool shaft 5 that is less than one half of a maximum movement amount and, consequently, a small drag force can be made to act on the spool 4 when rotation is restricted.

The cam surface 49 includes a first flat surface 49a, a second flat surface 49b, and a third slanted surface 49c. The first flat surface 49a is formed from the first position B to the reference position A and arranged to be substantially perpendicular to the spool shaft. The second flat surface 49b is formed from the second position E to a fourth position F, arranged to be parallel to the first flat surface 49a, and configured to protrude more in an axial direction than the first flat surface 49a. The third slanted surface 49c joins the first flat surface 49a and the second flat surface 49b together. The restricting protrusion 44a is formed between the first flat surface 49a and the third slanted surface 49c.

In this embodiment, the third slanted surface 49c comprises a fourth slanted surface 49d and a fifth slanted surface 49e having different slant angles and bordering each other at a third position D located 100° from the reference position A. The slant angle γ of the fourth slanted surface 49d is larger than 3° and equal to or smaller than 4°, and the slant angle δ of the fifth slanted surface 49e is larger than 2° and equal to or smaller than 3° (which is smaller than that of the fourth slanted surface 49d). A recessed portion 49f that is slightly recessed (e.g., 0.05 to 0.2 mm) in a circular arc shape is formed at the third position D and serves to inform a user of the strike position. The recessed portion 49f and the cam receiving pin 52a are formed to have approximately the same radius of curvature. When the strike position is passed, the slant angle decreases and, thus, the rate of increase of the drag force decreases.

The angular distance from the reference position A to the fourth position F is, for example, 170°. A restricting wall 49g arranged parallel to the spool shaft is formed at the fourth position F. A restricting wall 49g serves to restrict the drag release position such that the drag adjusting lever 2 does not rotate beyond that position. However, if the aforementioned stopper 35 was not there, then the drag adjusting lever could be rotated beyond the restricting wall 49g at the maximum drag position Thus, the stopper 35 serves to prevent the drag adjusting lever 2 from rotating beyond the maximum drag position. The restricting wall 49g is also configured to have a circular arc-shaped surface having the same radius of curvature as the cam receiving pins 52a.

Other Constituent Features of Cam Mechanism

As shown in FIGS. 4 and 5, the drag adjusting knob 51 is configured to screw onto an externally threaded portion 5c formed on an end portion of the spool shaft 5. The drag force of the strike position and an adjustment range of the drag force can be adjusted by adjusting the amount by which the drag adjusting knob 51 is screwed in or out. A knob sound generating mechanism 55 contrived to generate a sound when the drag adjusting knob 51 is operated is provided inside the drag adjusting knob 51. The knob sound adjusting mechanism 55 comprises a sounding recess 50f formed in the cam member 50, a sounding pin 55a installed in a storage hole 51a such that it can move toward and away from the sounding recess 50f, and a spring member 55b serving to spring load the sounding pin 55a toward the sounding recess 50f. The storage hole 51a is formed in the drag adjusting knob 51 to be generally parallel to the spool shaft 5.

As described previously, the cam receiving portion 52 has two cam receiving pins 52a erectly provided on an insert member 48 of the drag adjusting lever 2. The cam receiving pins 52a are rod-like members made of, for example, a stainless metal alloy and are secured to an outside circumferential surface of the small diameter cylindrical portion 48a of the insert portion 48 by press fitting, an adhesive, or other suitable fixing means. The cam receiving pins 52a serve to move the cam member 50 while contacting the cam surface 49.

The first force applying member 53 is arranged on an outside circumference of the spool shaft 5 between the bearing 20b and the bearing 20c. The first force applying member 53 spring loads the spool 4 in a direction of separating from the drag mechanism 6 and causes the cam member 50 to contact the cam receiving portion 52. The second force applying member 54 is arranged on an outside circumference of the spool shaft 5 in a position axially outward (leftward in FIG. 3) from the bearing 20a. The second force applying member 54 spring loads the spool 4 axially inward (rightward in FIG. 3) with respect to the spool shaft 5. The second force applying member 54 is arranged between the bearing 20a and a retaining ring 5b attached to the spool shaft 5. The first force applying member 53 applies a weaker force than the second force applying member 54. Consequently, when the spool shaft 5 moves axially rightward during a drag adjustment, the first force applying member 53 compresses first and the second force applying member 54 compresses next. The second force applying member 54 is provided in order to make the drag force change smoothly.

Constituent Features of the Drag Mechanism

The drag mechanism 6 is configured to move along an axial direction of the spool shaft 5 of the spool 4 and brake rotation of the spool 4 in the line reel-out direction. As shown in FIGS. 5 and 6, the drag mechanism 6 is housed inside a circular storage space 36 formed in the first flange portion 9b side of the spool 4. The drag mechanism 6 comprises a friction disk 21 arranged such that it can rotate integrally with the spool unit 9, a brake disk 22 arranged facing opposite the friction disk 21, and a cover member 26 serving to cover the storage space 36 from the axially outward direction of the spool shaft 5.

The friction disk 21 is arranged inside the storage space 36 such that it contacts an outward facing surface of the first flange portion 9b. The friction disk 21 is a circular disk-shaped member having at least one (e.g., four) engaging recess 21a formed in an external circumferential surface thereof and recessed in a radially inward direction. The friction disk 21 is connected to the spool unit 9 by the cover member 26 such that it can rotate integrally with the spool unit 9. The friction disk 21 is made of a heat resistant synthetic resin material, such as a fiber reinforced resin material made by impregnating, for example, a woven cloth made of carbon fibers with a phenol resin or other heat resistant resin.

The cover member 26 is a bottomed cylindrical member having a cylindrical portion 26a and a bottom portion 26b and made of a metal material, e.g., an aluminum alloy. The cover member 26 is fastened to an end face of the first flange portion 9b with a plurality of screw members 28 (see FIG. 5). The cover member 26 has a through hole 26c provided in a center of the bottom portion 26b through which the core member 25 of the brake disk 22 can pass. The cylindrical portion 26a has an external circumferential surface 26d configured to fit snugly inside an internal circumferential surface of the first flange portion 9b, i.e., of the storage space 36. The length of the cylindrical portion 26a in an axial direction of the spool shaft 5 is set such that when the cover member 26 is fastened to the first flange portion 9b, the distal end of the cylindrical portion 26 can contact a side surface of the friction disk 21. A circular protruding portion 26f is arranged to protrude from the external circumferential surface 26d of the cylindrical portion 26a and configured such that it can mate closely with an end face of the first flange portion 9b. The protruding portion 26f is arranged to face toward the end face of the first flange portion 9b and has screw through holes 26g that are configured for the screw members 28 (FIG. 7) to be installed through and arranged along a circumferential direction with spaces in-between. Threaded holes 9j (FIG. 7) configured for the screw members 28 to screw into are formed in the end face of the first flange portion 9b.

The cover member 26 has at least one engaging protrusion 26e configured to engage with the engaging recess 21a provided on a distal end surface of the cylindrical portion 26a. The engaging protrusions 26e (e.g., four) are formed on the distal end of the cylindrical portion 26a and protrude axially toward an outward facing surface of the first flange portion 9b. The engaging protrusions 26e are circular arc-shaped and arranged to be spaced apart along a circumferential direction. The axially protruding length of the engaging protrusions 26e is set such that a slight gap exists between the outward facing surface of the first flange portion 9b and the distal end portions of the engaging protrusions 26e.

The brake disk 22 is connected to the second one-way clutch 64 and is prohibited from rotating in the line reel-out direction. As shown in FIGS. 5 and 6, the brake disk 22 has donut-shaped sliding disk 24 arranged such that it can contact the friction disk 21 and a core member 25 that is mounted to the spool shaft 5 such that it cannot move axially but can rotate freely with respect to the spool shaft 5. The sliding disk 24 is made of stainless steel or another heat resistant, corrosion resistant metal material. The sliding disk 24 has a slightly smaller diameter than the friction disk 21 and is retained in place on the core member 25 by a retaining member 27. A rectangular engaging hole 24a is provided in a center portion of the sliding disk 24. The engaging hole 24a is configured to engage with the core member 25 such that the sliding disk can rotate integrally therewith.

The core member 25 is a generally cylindrical member made of, for example, an aluminum alloy. The core member 25 is rotatably supported on the spool shaft 5 with the aforementioned bearing 20c. An internal surface of a pinion gear 61 side of the core member 25 is formed into a rectangular engaging hole 25a (FIG. 5) configured to engage with the disk support portion 61b of the pinion gear 61 such that the core member 25 can rotate integrally with the pinion gear 61. A coupling groove 25b is formed in an end face of the core member 25 facing toward the pinion gear 61 along the direction of a diameter thereof. The coupling groove 25b is configured to couple to the ratchet wheel 66 of the second one-way clutch 64 such that the ratchet wheel 66 can rotate integrally with the core member 25. More specifically, the engaging protrusions 66b of the ratchet wheel 66 engage with the coupling groove 25b such that the ratchet wheel 66 rotates integrally with the pinion gear 61 and the core member 25.

A generally rectangular rotation preventing portion 25c for coupling to the sliding disk 24 in an integrally rotatable manner is formed on an external circumferential surface of the core member 25 on the opposite side as the pinion gear 61. The rotation preventing portion 25c engages with an engaging hole 24a (explained later) of the sliding disk 24 such that the core member 25 and the sliding disk 24 rotate as an integral unit. An annular groove 25d for installing the retaining member 27 is formed in the rotation preventing portion 25c. Also, an annular mounting groove 25e for mounting a seal member 29 to seal an inside of the cover member 26 is formed in an external circumferential surface between the rotation preventing portion 25c and the coupling groove 25b. Since an internal surface of the core member 25 engages with the pinion gear 61, the pinion gear 61 is restrained from moving axially outward (rightward in FIG. 5) by the reel unit 1 through the bearing 20d.

The seal member 29 has a lip 29a on an outer periphery thereof. The lip 29a is configured such that it does not contact the cover member 26 when the reel is in the drag released state shown in the portion of FIG. 5 drawn above the spool center axis X, and such that it contacts the cover member 26 and seals the inside thereof when the reel is in the maximum drag state shown in the portion of FIG. 5 drawn below the spool center axis X As a result, the resistance to rotation of the spool 4 can be decreased when the reel is in the drag released state and the spool is rotating freely.

When the drag mechanism 6 is assembled, the spool 4 is attached to the spool shaft 5 and then, for example, the brake disk 22 and the friction disk 21 are installed into the cover member 26. When this is done, the engaging protrusions 26e of the cover member 26 are made to engage with the engaging recesses 21a of the friction disk 21. Next, the spool shaft 5 is inserted and the protruding portion 26f of the cover member 26 is made to mate closely with an end face of the first flange portion 9b. If the protruding portion 26f will not mate closely, then the engaging protrusions 26e are not properly engaged with the engaging recesses 21a and the engaging protrusions 26e and the engaging recesses 21a should be realigned and engaged with one another again. Finally, the screw through holes 26g and the threaded holes 9j are aligned with one another and screw members 28 are installed so as to fasten the cover member 26 to the first flange portion 9b. In this way, the friction disk 21 is prevented from rotating with respect to the spool 4. As explained previously, it is easy to verify visually whether the engaging protrusions 26e and engaging recesses 21a are engaged with one another because a gap will exist between the protruding portion 26f and the end face of the first flange portion 9b if the engaging protrusions 26e are not engaged with the engaging recesses 21a. In this embodiment, the cover member 26—not the storage space 36—serves to prevent the friction disk 21 from rotating. Consequently, the cylindrical portion 26a of the cover member 26 can be fit snugly into the storage space 36 and the size of the gap between the cover member 26 and the storage space 36 can be decreased. Furthermore, since the protruding portion 26f mates closely with the end face of the first flange portion 9b, the friction disk 21 can be prevented from rotating while allowing the storage space 36 to have a shape that is easier to seal.

Additionally, since the cylindrical portion 26a is configured to have such a length along an axial direction of the spool shaft that the distal end of the cylindrical portion 26a can be in close proximity to a side face of the friction disk 21 when the cover member 26 is fastened to the first flange portion 9b, it is difficult for the friction disk 21 to wobble even when the brake disk 22 is separated from the friction disk 21.

The axial length of the engaging protrusions 26e along an axial direction of the spool shaft is set such that a gap exists between the engaging protrusions 26e and an outward facing surface of the first flange portion 9b. Consequently, the distal ends of the engaging protrusions 26e do not contact the outward facing surface of the flange portion 9b when the cover member 26 is fastened to the flange portion 9b and the gap between the cover member 26 and the storage space 36 can be reduced even further.

Constituent Features of the Spool Sound Generating Mechanism

Figure 11:
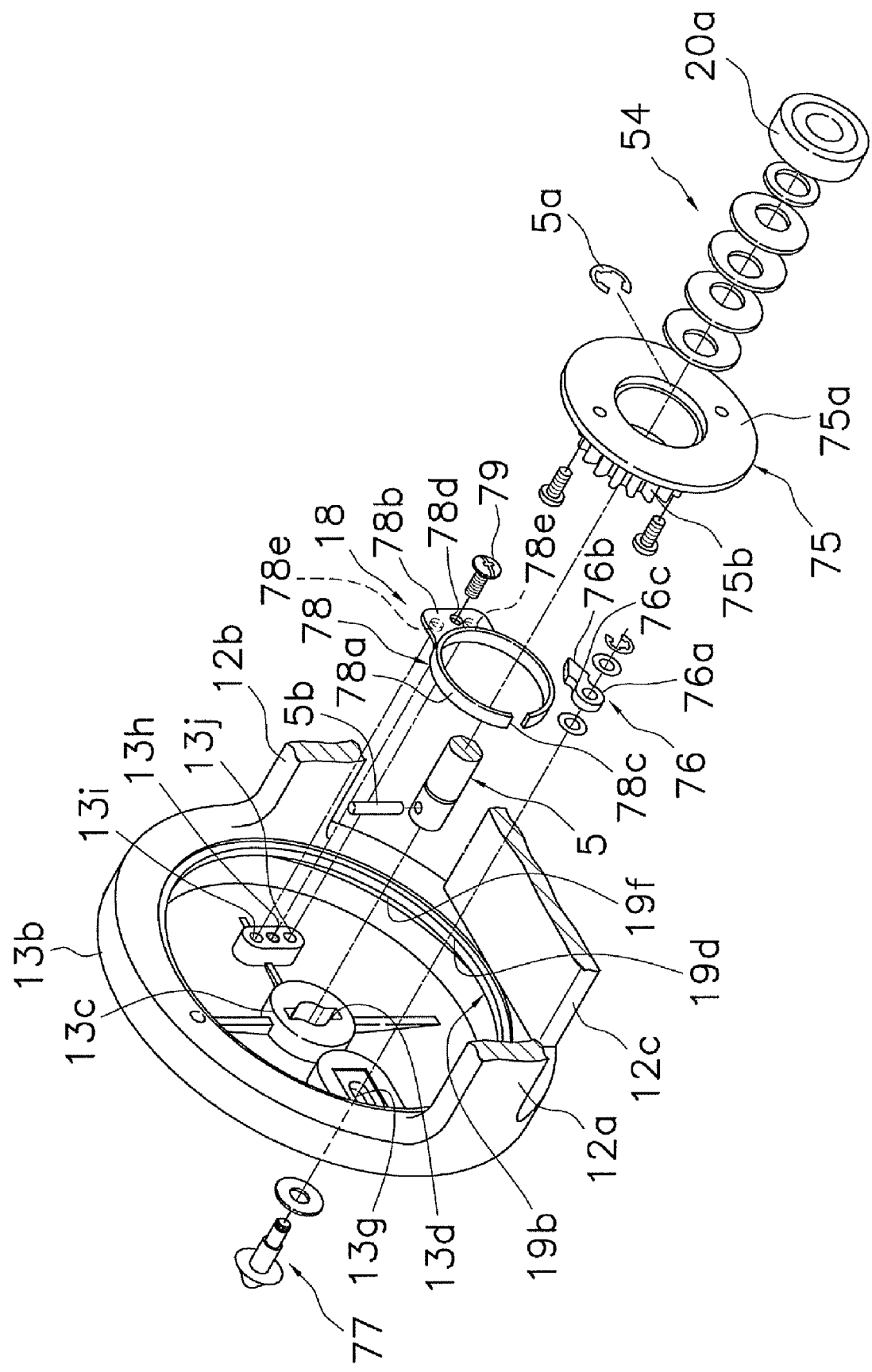
FIG. 11 is an exploded perspective view of the spool sound generating mechanism.

As shown in FIG. 8 and FIG. 11, the spool sound generating mechanism 18 comprises a sound generating member 75, a striker member 76, a knob member 77, and a force applying member 78. The sound generating member 75 is fixed to an outward facing surface of the second flange portion 9c of the spool unit 9. The striker member 76 is installed in the second side plate 13b such that it can move freely toward and away from a sound generating position where it contacts the sound generating member 75 and a soundless position where it is separated from the sound generating member 75. The knob member 77 moves the striker member 76. The force applying member 78 applies a force acting to load the striker member 76 toward a neutral position.

The sound generating member 75 is made of, for example, a synthetic resin material and has a circular disk-shaped mounting portion 75a fixed to the spool unit 9 and an undulated portion 75b formed integrally with the mounting portion 75a and having multiple gear tooth-like undulations formed on an external circumference thereof. The sound generating member 75 is arranged to rotate together with the spool 4.

The striker member 76 is made of, for example, a synthetic resin material and has a proximal end portion 76a pivotably supported in the knob member 77, a striker portion 76b that extends from the proximal end portion 76a in a tapered shape that is narrow at a distal end and is contrived to repeatedly strike against the undulated portion 75b, and a narrow neck portion 76c formed between the proximal end portion 76a and the striker portion 76b. When the striker member 76 retracts to the soundless position, it is arranged in a portion where the second escape portion 19f of the second cylindrical portion 11b is formed. Consequently, the striker member can be arranged further outward in a radial direction than in a conventional reel and a larger sound generating member 75 can be used. Thus, a larger number of undulations can be provided on the undulated portion 75b and a finer clicking sound can be generated.

The knob member 77 serves as an operating member for moving the striker member 76 to and from the sound generating position and the soundless position. The knob member 77 is a flanged shaft-like member having a shaft portion 77a and a knob portion 77b that is formed on a proximal end portion of the shaft portion 77a and has a larger diameter than the shaft portion 77a. The shaft portion 77a is guided by an elongated hole 13g passing from an outside surface to an inside surface of the second side plate 13b. The striker member 76 is pivotably coupled to a distal end of the shaft portion 77a.

The force applying member 78 is made of, for example, a synthetic resin material and has a C-shaped cylindrical spring portion 78a having an opposing faces portion 78c shaped like a place where a portion of a circle has been cut out and a plate-like mounting portion 78b formed on an intermediate portion of the spring portion 78a. The spring portion 78a is configured such that when the striker member 76 advances to the sound generating position, the neck portion 76c of the striker member 76 can contact the space of the opposing faces portion 78c. A middle portion of the mounting portion 78b has a fastening hole 78d configured for a screw member 79 to pass through and a pair of positioning protrusions 78e and 78f provided on opposite sides of the fastening hole 78d. The fastening hole 78d is arranged such that it can align with a threaded hole 13h that is formed in the inside surface of the second side plate 13b and configured for the screw member 79 to screw into, and the positioning protrusions 78e and 78f engage with positioning holes 13i and 13j formed on opposite sides of the threaded hole 13h. As a result, the force applying member 78 can be positioned more precisely and the number of parts can be reduced because the number of screw members used to fasten the force applying member can be reduced from two (the number used with a conventional force applying member) to one.

Procedure for the Setting Drag Force Adjustment Range

In a dual-bearing reel configured as described heretofore, the drag adjustment knob 51 is used to set a drag force adjustment range of the drag mechanism 6. When the drag adjusting knob 51 is rotated counterclockwise, it moves slightly leftward toward the state illustrated in the upper portion of FIG. 5 such that the drag force adjustment range is slightly weakened. Conversely, when the drag adjusting knob 51 is rotated clockwise, it moves slightly rightward toward the state illustrated in the lower portion of FIG. 5 such that the drag force adjustment range is slightly strengthened. More specifically, the drag adjustment range is adjusted such that a drag force will be produced when a weight having a prescribed mass is attached to the end of a fishing line and the fishing line is pulled while the drag adjusting lever 2 is in the strike position.

In order to adjust the strength of the drag force of the drag mechanism 6, a user rotates the drag adjusting lever 2. When the drag adjusting lever 2 is rotated fully toward the user to a drag release position indicated in FIG. 2 with a double-dot chain line, the cam receiving pins 52a are arranged on the first flat surface 49a in the drag release position shown in FIG. 10. If the drag adjusting lever 2 is rotated clockwise from the drag release position (clockwise from the perspective of FIG. 2), then the cam receiving pins 52a move along the first slanted surface 44c of the restricting protrusion 44a of the cam surface 49 and reach the apex 44b. Meanwhile, the weaker first force applying member 53 is compressed and the cam member 50 gradually moves outward along an axial direction of the spool shaft (rightward in FIG. 3) such that the spool shaft 5 and the spool 4 are gradually moved rightward (rightward in FIG. 3).

In a normal drag adjusting range, the friction disk 21 contacts the brake disk 22 and a drag force is generated when the cam receiving pins 52a are positioned in front of the apex 44b, i.e., on the first slanted surface 44c, in a position lower than the lowest position of the curved second slanted surface 44d. The drag force increases as the cam receiving pins 52a move toward the apex 44b of the restricting protrusion 44a and then temporarily weakens when the cam receiving pins 52a pass the apex 44b. Once the cam receiving pins 52a have passed the lowest position of the second slanted surface 44d, the cam receiving pins 52a contact the third slanted surface 49c and the drag force begins to gradually increase. When the cam receiving pins 52a reach the second flat surface 49b, the drag force becomes the largest value in the drag adjustment range. During a pivot operation of the drag adjusting lever 2 toward the apex 44b from the drag release position side, the drag force increases at a lower rate and the drag adjusting lever 2 is easier to operate because the slant angle of the first slanted surface 44c is smaller than the slant angle of the second slanted surface 44d (angle α<angle β).

If the drag adjusting lever 2 is rotated further clockwise (clockwise from the perspective of FIG. 2) after the brake disk 22 contacts the friction disk 21, then the Belleville springs constituting the second force applying member 54 will gradually compress as the spool shaft 5 moves. The drag force increases proportionally with a compression amount of the Belleville springs. When the strike position is reached, the cam receiving pins 52a enters the recessed portions 49f and the user experiences a small click-like feeling indicating that the drag adjusting lever 2 is in the strike position. When the drag adjusting lever 2 is in the strike position, a prescribed drag force is obtained in accordance with the adjustment of the drag adjusting knob 51. When the drag adjusting lever 2 is rotated beyond the strike position, the rate at which the drag force increases becomes smaller than prior to reaching the strike position. Finally, the drag force reaches the maximum value of the adjustment range when the cam receiving pins 52a reach the second flat surfaces 49b.

Conversely, when the drag adjusting lever 2 is rotated in the opposite direction (counterclockwise from the perspective of FIG. 2), the four Belleville springs constituting the second force applying member 54 and the coil spring constituting the first force applying member 53 spring load the spool 4 and the spool shaft 5 leftward from the perspective of FIG. 3 and the drag force gradually weakens. When the spring force exerted by the second force applying member 54 becomes weaker than the spring force exerted by the first force applying member 53, the friction disk 21 separates from the brake disk 22 and the drag mechanism enters a brake released state. When the cam receiving pins 52a reach the restricting protrusion 44a of the rotation restricting portion 44 during a counterclockwise operation of the drag adjusting lever 2, the drag force temporarily increases and the drag adjusting lever 2 becomes more difficult to rotate. Consequently, when the drag adjusting lever 2 is operated toward the drag release position, the drag adjusting lever 2 becomes more difficult to rotate (operate) just before it reaches the drag release position.

OTHER EXAMPLE EMBODIMENTS (a) Although in the previously described embodiment the striker mechanism 71 comprises a striker member 73 and a spring member 74, the present invention is not limited to such a striker mechanism. For example, it is acceptable to install a spring member having a spring quality into the drag adjusting lever and arrange for the spring member to contact an undulated portion directly in an elastic fashion.

(b) Although in the previously described embodiment the installation hole 72a is formed along an axis that is substantially perpendicular to the cone-shaped surface 70a, the present invention is not limited to such a configuration. It is acceptable for the installation hole 72a to be formed along an axis that is tilted in an axially outward direction of the spool shaft from an axis substantially perpendicular to the spool shaft.

With the present invention, the sound generating member has a cone-shaped surface that tapers to a smaller diameter in an axially outward direction and an undulated portion formed on the cone-shaped surface, and the striker mechanism contacts the undulated portion in an elastic fashion. Since the striker mechanism spring loads the sound generating member in an axially inward direction, the sound generating member can be retained in place by the striker mechanism. As a result, the sound generating member can be mounted to the boss without providing a separate retaining structure.

As used herein, the following directional terms "forward", "rearward", "above", "below", "radial", "axial", "vertical", "horizontal", "inner", "outer", "longitudinal" and "transverse" as well as any other similar directional terms refer to those directions of a device equipped with the present invention. Accordingly, these terms, as utilized to describe aspects of the present invention, should be interpreted relative to a device equipped with the present invention.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applied to words having similar meanings such as the terms, "including," "having," and their derivatives. Also, the term "part," "section," "portion," "member," or "element" when used in the singular can have the dual meaning of a single part or a plurality of parts.

The term "configured" as used herein to describe a component, section or part of a device implies the existence of other components, sections or parts necessary to carry out a desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A sound generating device installed in a fishing reel constructed to generate a sound in response to rotation of a drag adjusting lever mounted to an outer peripheral surface of a boss formed on a reel unit of the fishing reel to support a spool shaft such that the drag adjusting lever can rotate about the spool shaft, the sound generating device comprising:

a sound generating member movably mounted on the boss and including a substantially truncated cone-shaped member axially coinciding with the spool shaft and an undulated surface formed along the outer circumferential surface of the cone-shaped member, the sound generating member being non-rotatably disposed between an outer wall surface of the boss and the drag adjusting lever and free to move outwardly along the axial direction of the spool shaft relative to the outer wall surface of the boss; and a striker mechanism mounted to the drag adjusting lever and arranged to repeatedly contact the undulated surface upon rotation of the drag adjusting lever.

2. The sound generating device according to claim 1, wherein the drag adjusting lever having an installation portion defining an installation hole formed substantially perpendicular to the cone-shaped member.

3. The sound generating device according to claim 2, wherein the striker mechanism including a sounding pin and a force applying member installed in the installation hole, the sounding pin and the undulated surface being disposed at an angle relative to the axial direction of the outer circumferential surface of the spool shaft, the force applying member being operatively connected to the sounding pin so as to urge the sounding pin toward the undulated surface.

4. The sound generating device according to claim 3, wherein the boss is cylindrical and protrudes from an outside wall surface of the reel unit, and movement of the sound generating member in the axially inward direction is restricted by the outside wall surface.

5. The sound generating device according to claim 3, wherein the undulated surface including circular arc-shaped recesses.

6. The sound generating device according to claim 3, wherein the sounding pin is made of a synthetic resin.

7. A sound generating device for a dual-bearing reel constructed to generate a sound in response to rotation of a drag adjusting lever having an installation portion with an installation hole, the drag adjusting lever being mounted to an outer peripheral surface of a boss formed on a reel unit of the dual bearing reel to support a spool shaft so that the drag adjusting lever can rotate about the spool shaft, the sound generating device comprising:

a sound generating member movably mounted to the boss, the sound generating member including a substantially truncated cone-shaped member failed substantially perpendicular to the installation hole and axially coinciding with the spool shaft and an undulated surface formed along the outer side surface of the cone-shaped member, the sound generating member being free to move outwardly along the axial direction of the spool shaft and restricted from rotating; and a striker mechanism including a sounding pin and a force applying member installed in the installation hole, the sounding pin and the undulated surface being disposed at an inclined angle relative to the axial direction of the outer peripheral surface of the spool shaft, the force applying member being operatively connected to the sounding pin so as to urge the sounding pin toward the undulated surface, the striker mechanism being mounted to the drag adjusting lever and arranged to repeatedly contact the undulated surface upon rotation of the drag adjusting lever.

8. The sound generating device according to claim 1, wherein the fishing reel is a dual-bearing reel.

* * * * *